United States Patent
Henry

(10) Patent No.: US 9,139,072 B2
(45) Date of Patent: Sep. 22, 2015

(54) VEHICLE DOOR COVERING

(71) Applicant: Rupert Donovan Henry, Kissimmee, FL (US)

(72) Inventor: Rupert Donovan Henry, Kissimmee, FL (US)

(*) Notice: Subject to any disclaimer, the term of this patent is extended or adjusted under 35 U.S.C. 154(b) by 0 days.

(21) Appl. No.: 14/314,857

(22) Filed: Jun. 25, 2014

(65) Prior Publication Data

US 2015/0202951 A1     Jul. 23, 2015

Related U.S. Application Data

(60) Provisional application No. 61/929,257, filed on Jan. 20, 2014.

(51) Int. Cl.
| | | |
|---|---|---|
| *B60J 1/20* | (2006.01) | |
| *B60J 7/00* | (2006.01) | |
| *B60J 11/06* | (2006.01) | |
| *B60J 5/04* | (2006.01) | |

(52) U.S. Cl.
CPC .............. *B60J 5/0494* (2013.01); *B60J 1/2091* (2013.01); *B60J 11/06* (2013.01)

(58) Field of Classification Search
CPC ........ B60J 5/0494; B60J 1/2091; B60J 11/06; Y10S 160/02
USPC ........ 135/88.05, 88.07, 88.09; 296/99.1, 152; 160/370.23, 370.21, 368.1, 84.07, 97, 160/134, 84.04, 84.08; 229/87.03
See application file for complete search history.

(56) References Cited

U.S. PATENT DOCUMENTS

| | | | | |
|---|---|---|---|---|
| 1,221,595 | A * | 4/1917 | Riggs ................................ 49/60 |
| 4,201,412 | A * | 5/1980 | Williams et al. .............. 296/163 |
| 4,671,334 | A * | 6/1987 | Yadegar et al. ............ 160/84.04 |
| 4,751,115 | A * | 6/1988 | Smith et al. ..................... 428/12 |
| 4,758,042 | A * | 7/1988 | Liu ............................... 296/97.7 |
| 4,775,180 | A * | 10/1988 | Phillips ....................... 160/84.04 |
| 4,848,825 | A * | 7/1989 | Niernberger ................. 296/95.1 |
| 4,865,106 | A * | 9/1989 | Wichelman ................ 160/84.04 |
| 4,974,655 | A * | 12/1990 | Teachout .................... 160/84.04 |
| RE33,804 | E * | 1/1992 | Phillips ....................... 160/84.04 |
| 5,158,127 | A * | 10/1992 | Schumacher .............. 160/84.07 |
| 5,170,830 | A * | 12/1992 | Coslett ....................... 160/84.04 |
| 5,314,226 | A * | 5/1994 | Tovar .......................... 296/97.7 |
| 5,476,302 | A * | 12/1995 | Ronci ......................... 296/99.1 |
| 5,692,554 | A * | 12/1997 | Huang ..................... 160/370.23 |
| 5,937,929 | A * | 8/1999 | Chen ....................... 160/370.23 |
| 6,044,856 | A * | 4/2000 | Cano .......................... 135/88.07 |
| 6,135,193 | A * | 10/2000 | Lloyd ..................... 160/370.23 |
| 6,152,206 | A * | 11/2000 | Chen ........................ 160/84.06 |
| 6,202,732 | B1 * | 3/2001 | Chen ....................... 160/370.23 |
| 6,948,766 | B1 * | 9/2005 | Capote et al. ................. 296/152 |
| 7,604,281 | B1 * | 10/2009 | Raynor ...................... 296/99.1 |
| 7,819,458 | B2 * | 10/2010 | Raynor ...................... 296/99.1 |

(Continued)

*Primary Examiner* — Robert Canfield

(57) ABSTRACT

A weather shield is provided. The weather shield may be adapted to provide shelter to an occupant entering or exiting a vehicle. The weather shield may include a plurality of elongated panels which may be pivotably joined together along their elongated sides so that the weather shield moves from an unfolded position to a folded position. The plurality of elongated panels may be bookended by two opposing fabric panels and/or sets of pleated material that may be detachably mounted to a vehicle door and the vehicle's frame so that when the vehicle door opens the weather shield extends to the unfolded position, thereby providing shelter. Upon closing the vehicle door, the weather shield moves to the folded position so as to not interfere with the occupant's comfort nor inhibit operation of the vehicle.

19 Claims, 4 Drawing Sheets

(56) References Cited

U.S. PATENT DOCUMENTS

| | | | |
|---|---|---|---|
| 8,079,629 B2* | 12/2011 | Raynor | 296/99.1 |
| 2003/0006015 A1* | 1/2003 | Lin | 160/370.23 |
| 2003/0192581 A1* | 10/2003 | Chang | 135/88.07 |
| 2005/0189784 A1* | 9/2005 | Guerreiro et al. | 296/152 |
| 2005/0247411 A1* | 11/2005 | Shim | 160/84.07 |
| 2007/0241586 A1* | 10/2007 | Clark | 296/152 |
| 2012/0055640 A1* | 3/2012 | Wu | 160/352 |

* cited by examiner

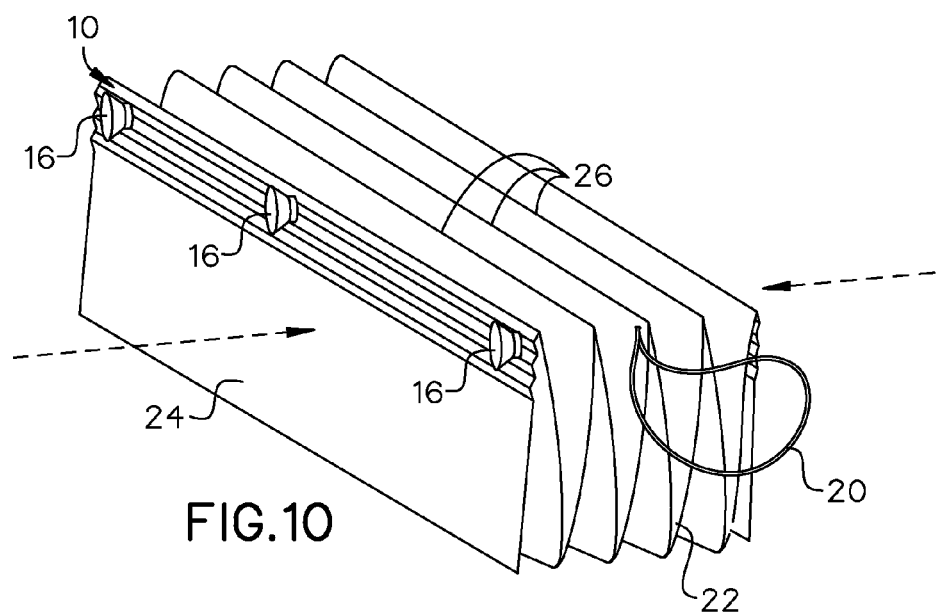
FIG.10
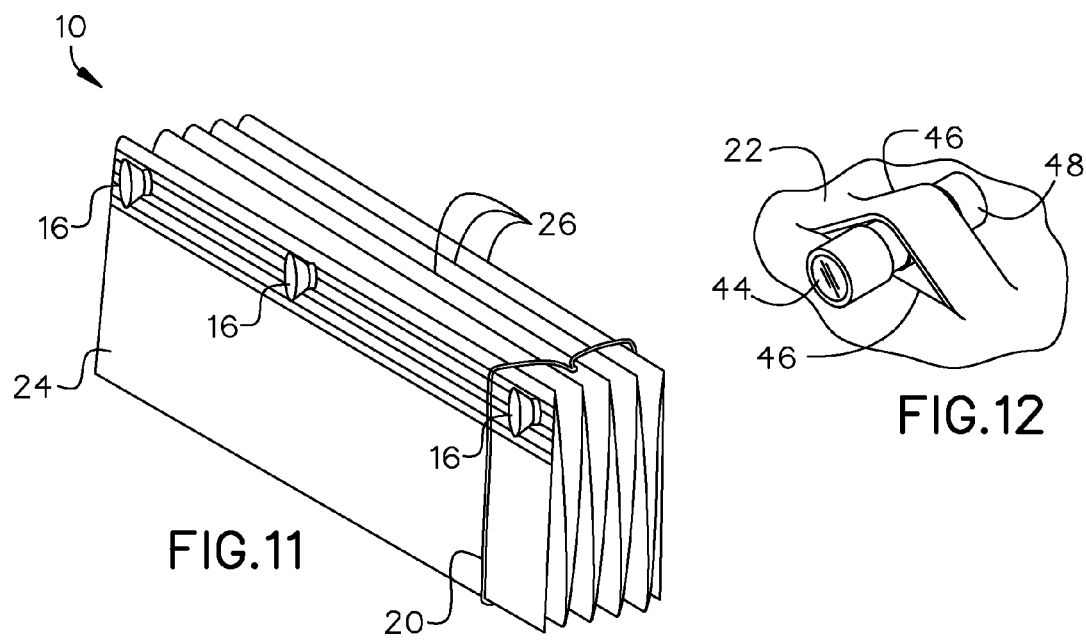
FIG.11
FIG.12

US 9,139,072 B2

VEHICLE DOOR COVERING

CROSS-REFERENCE TO RELATED APPLICATION

This application claims the benefit of priority of U.S. provisional application No. 61/929,257, filed 20 Jan. 2014, the contents of which are herein incorporated by reference.

BACKGROUND OF THE INVENTION

The present invention relates to sun and rain covers and, more particularly, to a sun and rain cover for vehicles.

It is virtually impossible to enter or exit a vehicle during inclement weather without getting substantially wet. As soon as the vehicle door is opened during inclement weather, a passenger will begin to get wet.

As can be seen, there is a need for an apparatus for providing shelter to an occupant entering or exiting a vehicle.

SUMMARY OF THE INVENTION

In one aspect of the present invention, a weather shield comprises: a plurality of elongated panels, each defined by opposing elongated edges, a first edge and a second edge, wherein the plurality of elongated panels are connected along their elongated edges so that the plurality of elongated panels fold together along their elongated edges; two sets of pleated material, wherein each set of pleated material is connected to opposing termini of the plurality of elongated panels; and a plurality door fasteners provided by each set of the pleated material In another aspect of the present invention, method of providing shelter to an occupant entering or exiting a vehicle, comprises: providing a weather shield comprising: a plurality of elongated panels, each elongated panel having opposing elongated edges, wherein the plurality of elongated panels are connected along their elongated edges so that the plurality of elongated panels fold together along their elongated edges; two sets of pleated material, wherein each set of pleated material is connected to opposing termini of the plurality of elongated panels; a plurality door fasteners provided by each set of pleated material; and a pair of fabric panels, wherein each fabric panel is connected to opposing termini of the pair of pleated material, and wherein each fabric panel provides of a plurality of first and second fasteners; detachably mounting the first and second fasteners of one fabric panel to a door frame of the vehicle; detachably mounting the plurality of door fasteners of the pleated material on the opposing end of the weather shield to a door of the vehicle, so that the weather shield moves from a folded position to an unfolded position when the door is opened; and opening the door.

These and other features, aspects and advantages of the present invention will become better understood with reference to the following drawings, description and claims.

BRIEF DESCRIPTION OF THE DRAWINGS

FIG. 10 is a perspective view of an exemplary embodiment of the present invention illustrating a folded position;

FIG. 11 is a perspective view of an exemplary embodiment of the present invention; and FIG. 12 is a perspective detail view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a weather shield. The weather shield may be adapted to provide shelter to an occupant entering or exiting a vehicle. The weather shield may include a plurality of elongated panels which may be pivotably joined together along their elongated sides so that the weather shield moves from an unfolded position to a folded position. The plurality of elongated panels may be bookended by two opposing fabric panels and/or sets of pleated material that may be detachably mounted to a vehicle door and the vehicle's frame so that when the vehicle door opens the weather shield extends to the unfolded position, thereby providing shelter. Upon closing the vehicle door, the weather shield moves to the folded position so as to not interfere with the occupant's comfort nor inhibit operation of the vehicle.

Figure 1:
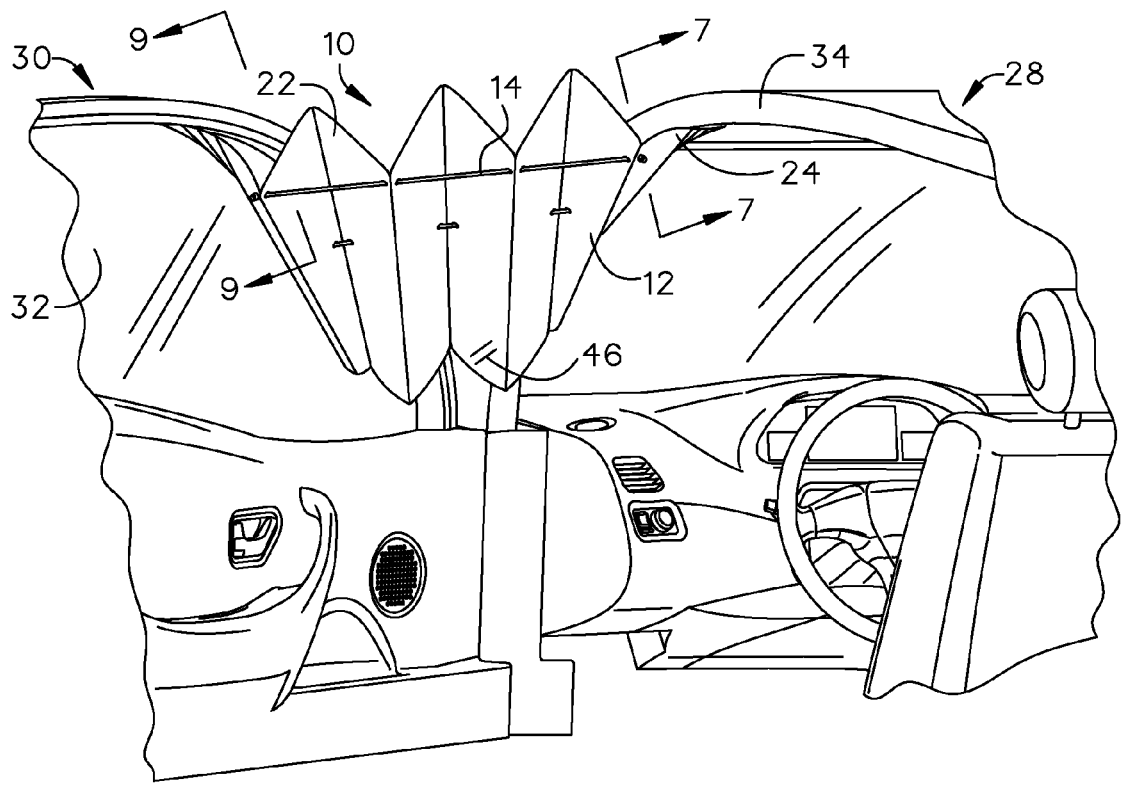
FIG. 1 is a perspective view of an exemplary embodiment of the present invention.
Figure 2:
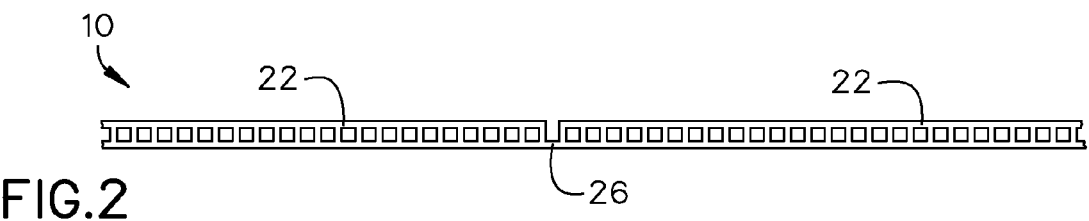
FIG. 2 is a section view of an exemplary embodiment of an elongated side of the present invention.
Figure 3:
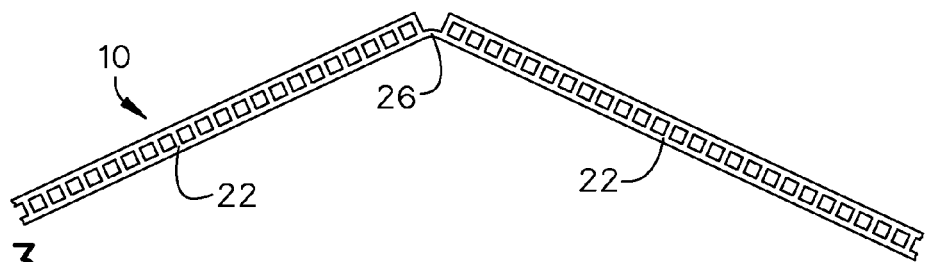
FIG. 3 is a section view of an exemplary embodiment of the elongated side illustrating the foldable nature of the present invention.
Figure 4:
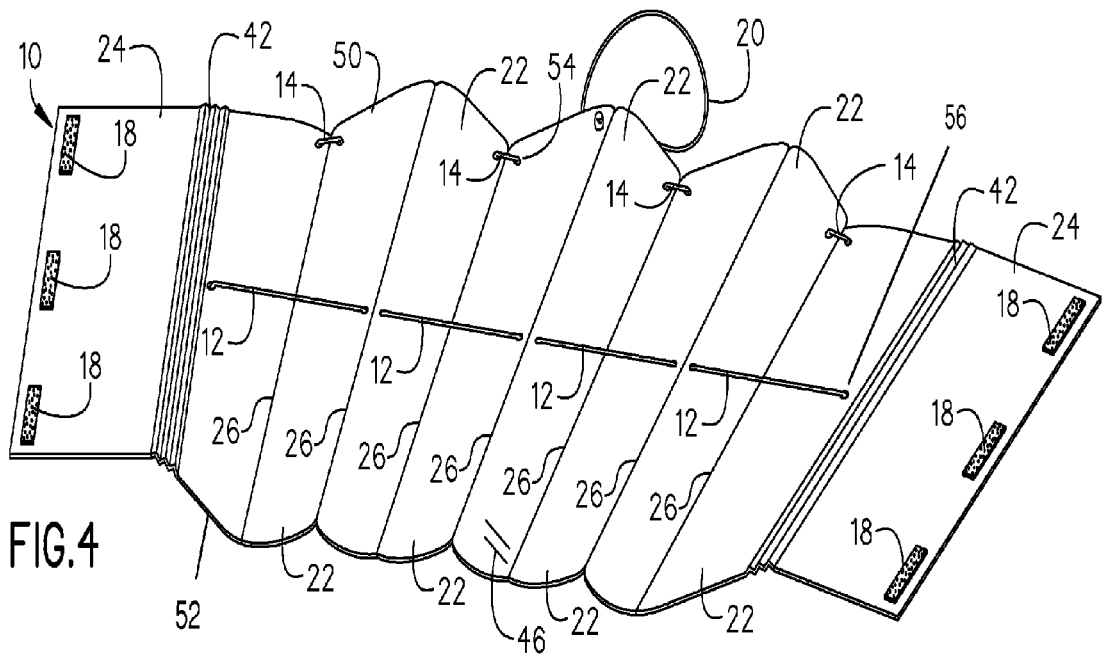
FIG. 4 is a top perspective view of an exemplary embodiment of the present invention.
Figure 5:
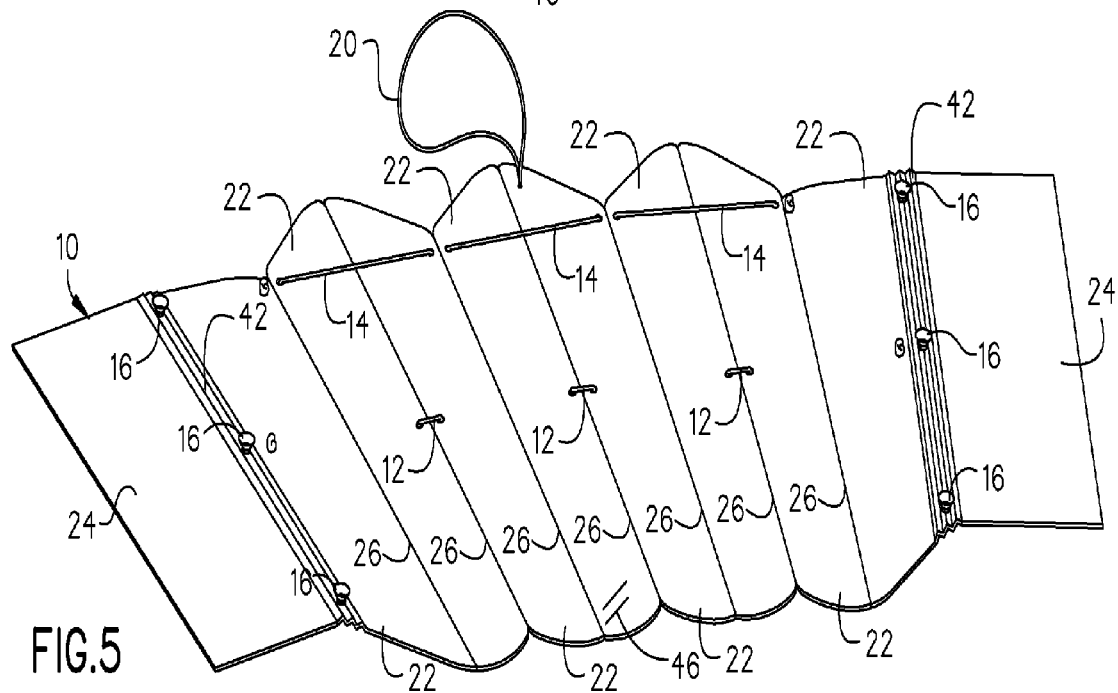
FIG. 5 is a bottom perspective view of an exemplary embodiment of the present invention.
Figure 6:
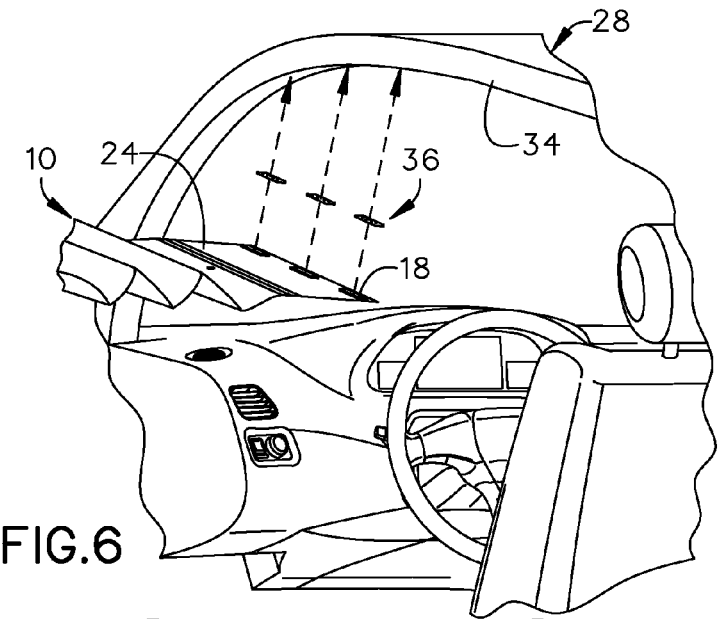
FIG. 6 is a perspective detail view of an exemplary embodiment of the present invention.
Figure 7:
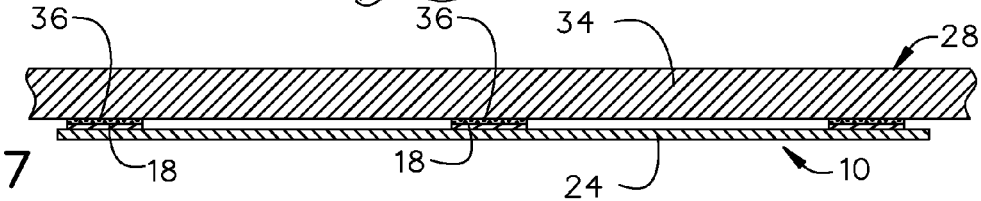
FIG. 7 is a section detailed view of an exemplary embodiment of the present invention along line 7-7 in FIG. 1.
Figure 8:
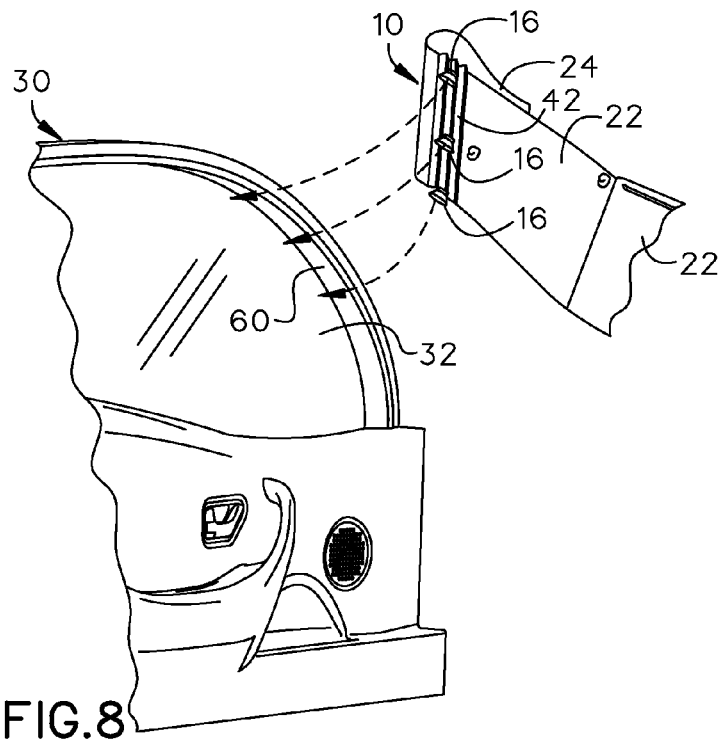
FIG. 8 is a perspective detail view of an exemplary embodiment of the present invention illustrating installation.
Figure 9:
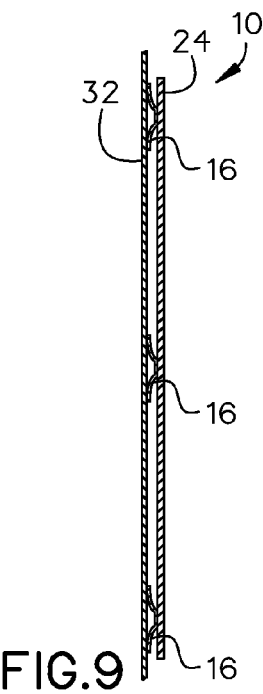
FIG. 9 is a section detailed view of an exemplary embodiment of the present invention along line 9-9 in FIG. 1.

Referring to FIGS. 1 through 12, the present invention may include a weather shield 10. The weather shield 10 may include a plurality of elongated panels 22 which may be pivotably joined together along their elongated sides 26 so as to fold in and out of a folded position and a unfolded position. The weather shield 10 may be made of waterproof and/or water-resistant material that can be repeatedly bent without fracturing, such as polyethylene, polypropylene, vinyl, nylon, rubber, leather, various impregnated or laminated fibrous materials, various plasticized materials and the like. The elongated sides 26 may include live hinges or folding grooves of reduced dimensional thickness relative to the adjacent elongated panels. The elongated sides 26 may be adapted so that a user may apply a force along the width of the plurality of elongated panels 22 so as to cause the weather shield 10 to move from the folded position to the unfolded position, or vice versa, folding along the plurality of elongated sides 26. The folded position may resemble an accordion, as illustrated in FIGS. 10 and 11.

Each elongated panel 22 may be defined by a first edge 50, a second edge 52 and the two opposing elongated sides 26. Near the intersection of the first edge 50 and one of the two elongated sides 26, each elongated panel 22 may form a top aperture 54. Near the midpoint of the opposing elongated side 26 each elongated panel 22 may form a mid aperture 56. In certain embodiments, a portion of the first edge 50 and/or the second edge may include a reflective material. The reflective material may be adapted so that lights, such as head lights, will be reflected back so as to indicate the presence of the weather shield 10 and the attached vehicle 28 during dark or other poor visibility conditions.

Adjacent elongated panels 22 may be connected by a middle elastic band 12 and an upper elastic band 14. The middle elastic band 12 may be interwoven through the plurality of adjacent mid apertures 56 so that when in the unfolded position, the tension in the middle elastic band 12 tends to urge the adjacent elongated panels 22 together so that the plurality of the elongated panel 22 are biased in the folded position.

The upper elastic band 14 may be interwoven through the plurality of adjacent top apertures 54 so that when in the unfolded position, the tension in the upper elastic band 14 tends to urge the adjacent elongated panels 22 together so that the plurality of the elongated panels 22 are biased in the folded position.

The plurality of elongated panels 22 may be bookended by two opposing fabric panels 24. Each bookending fabric panel 24 may be foldably joined to the adjacent terminus elongated side 26 by pleated material 42. The pleated material may move from a folded position to an unfolded position so as to coincide with the plurality of elongated panels 22 as well as retract and expand on its own. The pleated material 42 may be adapted to move to the unfolded position so as to accommodate various lengths when installing the weather shield 10.

Each fabric panel 24 may include a plurality of first fasteners 18 and corresponding second fasteners 36. The pleated material 42 and/or the fabric panels 24 may include a plurality of door fasteners 16. The plurality of door fasteners 16 may include suction cups or other conventional fasteners for removably securing an object to glass. It should be understood that the plurality of fasteners 18, 36 may be any fastener known in the art for fastening or removably securing one object to another including, for example, standard push-button snaps, Velcro-type fasteners, adhesive substances, combinations thereof, and the like. It should also be that the plurality of fasteners 18, 36, may be configured in any array and/or number, so long as the fasteners function in accordance with the present invention as described herein.

The weather shield 10 may include a securing strap 20 adapted so as to removably secure the weather shield 10 when in the folded position. In certain embodiments, the weather shield 10 may include at least one flashlight 48 protruding through at least one slit 46 formed in at least one elongated panel 22. The at least one flashlight 48 may be secured by a band defined by the at least one slit 46.

A method of using the present invention may include the following. The weather shield 10 disclosed above may be provided. A user may operably connect the weather shield 10 to a vehicle 28 by attaching one fabric panel 24 to a vehicle frame 34 and the plurality of door fasteners 16 to a vehicle door window 32. The user may connect the plurality of second fasteners 36 to the vehicle frame 34 so that the user may removably fasten the plurality of first fasteners 18 thereto, thereby detachably mounting the fabric panel 24. The user may detachably mount the pleated material to the vehicle door 30 by removably attaching the plurality of door fasteners 16 to the vehicle door window 32. After operably connecting the weather shield 10 to the vehicle 28, the weather shield 10 may extend to the unfolded position when the vehicle door 30 opens so as to provide shelter to an occupant entering or exiting the vehicle 28. Upon closing the vehicle door 30, the weather shield 10 moves to the folded position so as to not interfere with an occupant's comfort nor inhibit operation of the vehicle. The vehicle door may include the driver side door and any of the passenger doors of the vehicle 28.

In certain embodiments, the weather shield 10 may be used to provide shade from the sun. In an alternative embodiment, the weather shield 10 may be sized and dimensioned to substantially cover of a windshield so as to act as a sun shade that prevents the interior space of the vehicle 28 from becoming excessively heated when parked in the sun. The weather shield 10 may be removably attached to the windshield by affixing the plurality of door fasteners 16 from at least one fabric panel 24 to the windshield and/or a supporting windshield frame.

It should be understood, of course, that the foregoing relates to exemplary embodiments of the invention and that modifications may be made without departing from the spirit and scope of the invention as set forth in the following claims.

What is claimed is:

1. A weather shield comprising:
    a plurality of elongated panels, each defined by opposing elongated edges, a first edge and a second edge, wherein the plurality of elongated panels are connected along their elongated edges so that the plurality of elongated panels fold together along their elongated edges;
    two sets of pleated material, wherein each set of pleated material is connected to opposing termini of the plurality of elongated panels;
    a pair of fabric panels, wherein each fabric panel is connected to opposing termini of the two sets of pleated material, and wherein each fabric panel provides of a plurality of first and second fasteners; and
    a plurality of door fasteners provided by each set of the pleated material.

2. The weather shield of claim 1, further including folding grooves formed along the plurality of elongated edges.

3. The weather shield of claim 1, wherein each door fastener is a suction cup.

4. The weather shield of claim 1, further including a plurality of aligned mid apertures, wherein at least one of the aligned mid aperture is defined by each elongated panel, and further including at least one elastic band interwoven through the plurality of aligned mid apertures so as to approximately span the plurality of elongated panels.

5. The weather shield of claim 4, further including a plurality of aligned top apertures, wherein at least one of the aligned top aperture is defined by each elongated panel, and further including at least one elastic band interwoven through the plurality of aligned top apertures so as to approximately span the plurality of elongated panels.

6. The weather shield of claim 1, further including reflective material integrated into a portion of the first edge of substantially all of the plurality of elongated panels.

7. The weather shield of claim 1, further including reflective material integrated into a portion of the second edge of substantially all of the plurality of elongated panels.

8. The weather shield of claim 1, further including-at least one slit formed by at least one elongated panel, and further including at least one flashlight securely received by the slit.

9. The weather shield of claim 1, further including a securing strap connected to the weather shield.

10. A weather shield comprising:
    a plurality of elongated panels, each defined by opposing elongated edges, a first edge and a second edge, wherein the plurality of elongated panels are connected along their elongated edges so that the plurality of elongated panels fold together along their elongated edges;

two sets of pleated material, wherein each set of pleated material is connected to opposing termini of the plurality of elongated panels;

a plurality of door fasteners provided by each set of the pleated material; and at least one slit formed by at least one elongated panel, and further including at least one flashlight securely received by the slit.

11. The weather shield of claim 10, further including folding grooves formed along the plurality of elongated edges.

12. The weather shield of claim 10, wherein each door fastener is a suction cup.

13. The weather shield of claim 10, further including a plurality of aligned mid apertures, wherein at least one of the aligned mid aperture is defined by each elongated panel, and further including at least one elastic band interwoven through the plurality of aligned mid apertures so as to approximately span the plurality of elongated panels.

14. The weather shield of claim 13, further including a plurality of aligned top apertures, wherein at least one of the aligned top aperture is defined by each elongated panel, and further including at least one elastic band interwoven through the plurality of aligned top apertures so as to approximately span the plurality of elongated panels.

15. The weather shield of claim 10, further including reflective material integrated into a portion of the first edge of substantially all of the plurality of elongated panels.

16. The weather shield of claim 10, further including reflective material integrated into a portion of the second edge of substantially all of the plurality of elongated panels.

17. The weather shield of claim 10, further including a securing strap connected to the weather shield.

18. A method of providing shelter to an occupant entering or exiting a vehicle, comprising:

providing a weather shield comprising: a plurality of elongated panels, each elongated panel having opposing elongated edges, wherein the plurality of elongated panels are connected along their elongated edges so that the plurality of elongated panels fold together along their elongated edges; two sets of pleated material, wherein each set of pleated material is connected to opposing termini of the plurality of elongated panels; a plurality door fasteners provided by each set of pleated material; and a pair of fabric panels, wherein each fabric panel is connected to opposing termini of the pair of pleated material, and wherein each fabric panel provides of a plurality of first and second fasteners;

detachably mounting the first and second fasteners of one fabric panel to a door frame of the vehicle;

detachably mounting the plurality of door fasteners of the pleated material on the opposing end of the weather shield to a door of the vehicle, so that the weather shield moves from a folded position to an unfolded position when the door is opened; and opening the door.

19. The method of claim 18, wherein the door of the vehicle is the window glass of said door.

* * * * *